United States Patent Office 2,812,149
Patented Nov. 5, 1957

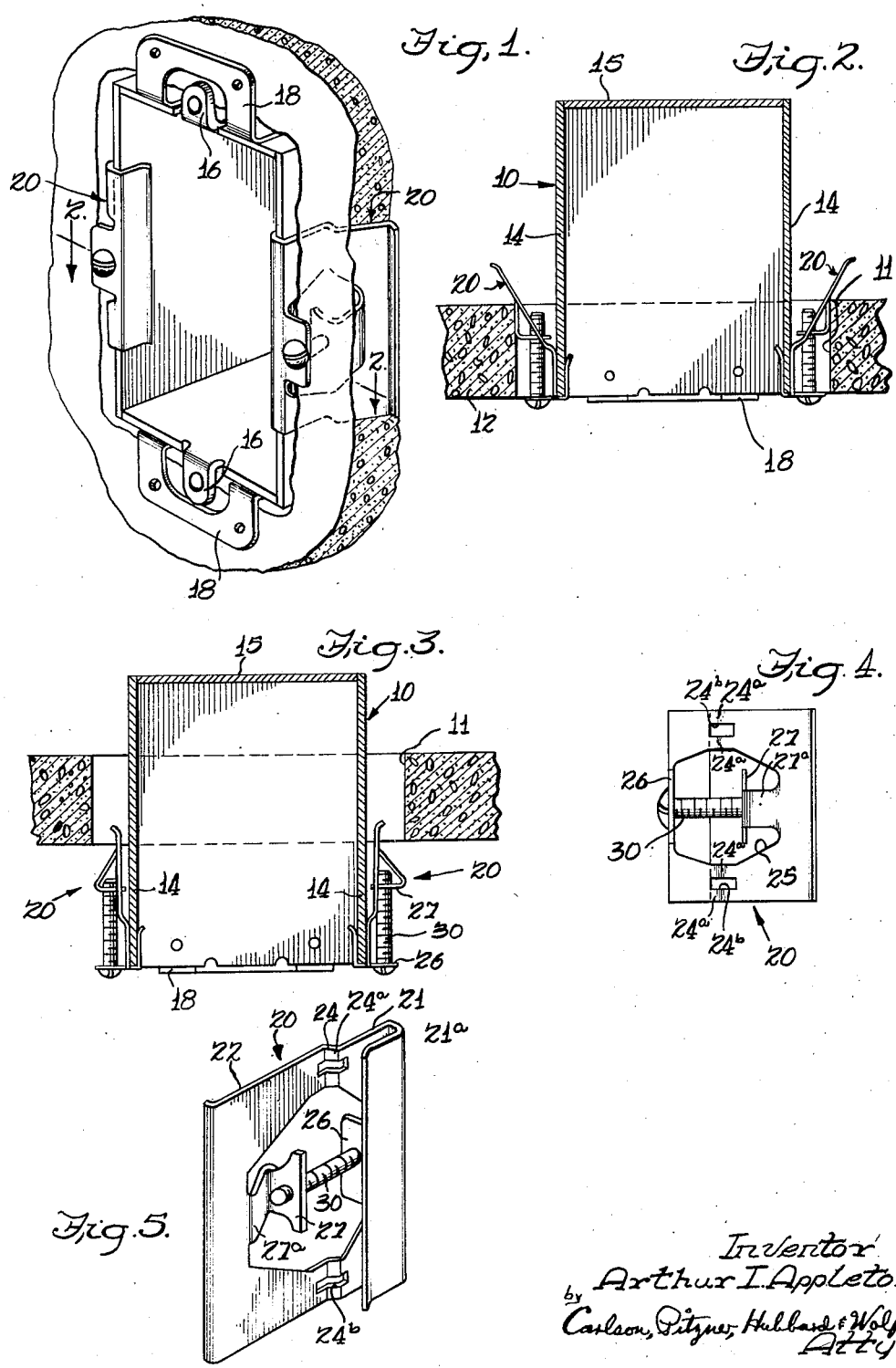

2,812,149

MOUNTING CLAMP FOR SWITCH BOXES AND THE LIKE

Arthur I. Appleton, Northbrook, Ill.

Application June 11, 1954, Serial No. 436,203

1 Claim. (Cl. 248—27)

The present invention relates in general to means for mounting fixtures such as switch boxes, and has for its general aim to make possible the quick and convenient mounting of fixtures in partially or totally recessed relation by clamping them directly to a wall panel.

In re-wiring old structures or installing new electrical switches and outlets in existing walls, difficulty is often encountered in firmly mounting switch boxes, outlet boxes and other like fixtures in partially or totally recessed relation. Access cannot be had to nail or screw the fixtures to studs or other parts of the framework within the wall. Moreover, the wall panels themselves are often so brittle (as in the case of old plaster) or so soft (as in the case of fiberboard panels), that the fixture cannot be fastened directly to the wall by nails passed through mounting flanges. Even where the latter method might be employed, it may happen that the opening in the wall has become oversize by removal of a prior fixture, or that earlier formed nail holes lie where the new nails should go, so that rigid mounting of the new fixtures cannot be readily obtained.

It is an object of the present invention to eliminate this difficulty and provide a clamp for mounting fixtures in partially or totally recessed relation in old or existing walls, as well as new walls, without resort to nails, screws, or other similar fasteners. Concurrently, another object is to provide means for mounting a fixture, such as a switch box, in existing walls by successfully clamping the fixture to a wall panel even though the mounting opening in the latter is somewhat oversize or if the panel is too soft or brittle to receive nails.

Still another object is to provide a clamp for accomplishing the foregoing objectives which is simple to manufacture and economical in cost, yet which permits quick, convenient and positive mounting of fixtures.

Other objects and advantages will become apparent as the following description proceeds, taken in conjunction with the accompanying drawings, in which:

Figure 1 is a perspective view of a switch box mounted in a wall panel by clamping means embodying the features of the invention;

Fig. 2 is a horizontal section taken substantially along the line 2—2 in Fig. 1;

Fig. 3 is similar to Fig. 2, illustrating the switch box and clamps as they are being inserted into the opening of a wall panel;

Fig. 4 is a side elevation of one of the clamps; and

Fig. 5 is a perspective view, taken from the opposite side, of the clamp shown in Fig. 4.

While the invention has been shown and is described in some detail with reference to a particular embodiment thereof, there is no intention that it thus be limited to such detail. On the contrary, it is intended here to cover all modifications, alternative constructions and equivalents falling within the spirit and scope of the invention as defined by the appended claim.

Referring more particularly to the drawings, an illustrative switch box 10 is there shown (Figs. 1 and 2) as mounted in recessed relation within an opening 11 in a wall panel 12. While the mounting arrangement disclosed herein is applicable to a wide variety of fixtures, such as outlet boxes, junction boxes, lamp receptacles and others of like nature, the switch box 10 has been shown merely by way of example. The box 10 has an open end and comprises four side walls 14 and an end wall 15, being disposed with its open end to the exterior of the panel 12. The switch box is further provided with integral tabs 16 suitably apertured and tapped to receive fastening screws which mount a switch and cover plate (not shown). Disposed substantially in the same plane as the tabs 16 are a pair of mounting flanges 18 which extend at right angles with respect to their corresponding side walls 14 and which are adapted to bear against the exposed face of the panel 12 when the box is mounted in recessed relation with such panel.

The wall of which the panel 12 is a part may be of conventional spaced, double-panel construction including suitable studs or other framework and insulation between the panels. While the present mounting clamps may be employed in a mounting fixture in new walls, it will be assumed for purposes of explanation that the panel 12 is a part of an existing or old wall. The opening 11 is therefore illustrated as being somewhat irregular and oversize with respect to the switch box 10, as might be the case where an old fixture has been ripped out.

One or more clamps 20 are employed to mount the switch box 10 in recessed relation with the wall panel 12. In accordance with the invention, each such clamp comprises an attachment portion 21 which is adapted to be fixed to one side of the switch box 10, together with a jaw portion 22 which lies originally in a plane substantially parallel to the side of the box 10 when the clamp is fixed thereto. For permitting the jaw portion 22 to swing relative to the attachment portion 21, the two parts are interconnected by hinge means 24, such means preferably being formed by weakening a portion of the clamp which is situated intermediate the attachment portion 21 and the jaw portion 22. In order to positively deflect the jaw portion 22 from its original position relative to the attachment portion 21, take-up means are connected between these two portions. Such take-up means may assume any one of a variety of forms as long as a tensioning action is provided which rocks the jaw portion 22 outwardly from the switch box 10 after the latter has been inserted through the opening 11 in the panel 12.

In somewhat more detail, the clamps 20 are preferably formed from a single piece of sheet metal stock, and the attachment portion 21 formed with a flared, inwardly disposed channel 21a which is adapted to clip over the exposed edge of one of the box walls 14, as shown best in Figs. 2 and 3. The jaw portion 22 is in this instance, of plate-like form and oriented so as to permit the entry of the clamp, when fixed on a switch box 10, into a relatively small opening in the panel 12. As illustrated best in Fig. 3, the jaw portion 22 is originally substantially parallel to the external surface of the adjacent box wall 14 and closely spaced therefrom.

While the hinge means 24 may take a variety of forms, in the interest of simplicity and economy it has been found convenient to utilize for such means a weakened or scored section in that part of the sheet metal piece which connects the attachment and jaw portions 21, 22. As here shown, such an arrangement is provided by two pairs of reversely bent connecting strips 24a, each pair of connecting strips disposed on opposite sides of a large central aperture 25 formed in the sheet metal piece. Cut-out portions 24b may be provided between each pair of strips 24a to further weaken the hinge portion and thus assure that the jaw portion 22 may be easily swung outwardly about a single transverse axis relative to the attachment portion 21.

For receiving take-up means to effect such swinging movement of the jaw portion 22, the attachment portion 21 and jaw portion 22 are each provided with anchor formations here shown as first and second tabs 26, 27 which extend at substantially right angles to the original plane of the jaw portion 22 (see Fig. 3). It is to be particularly noted, that the tab 26 is formed from a part of the original sheet metal blank and is simply bent outwardly to the position illustrated, thus leaving, in part, the aperture 25. The second tab 27 is formed in a similar manner but includes a supporting leg 27a turned outwardly from the jaw portion 22 and reversely bent inwardly to present the tab 27 at substantially right angles to the original plane of the jaw portion 22.

The tensioning or take-up means here illustrated in the present case may take the form of a machine screw 30 which is inserted through a hole in the first tab 26 and into threaded engagement with an alined tapped hole in the second tab 27. It will be seen, therefore, that simply by tightening the screw 30, the clamp is deformed at its weakened hinge portions 24 and the jaw portion 22 swung outwardly relative to the attachment portion 21. As this occurs (see Fig. 2), the free end of the screw 30 is completely free of the jaw portion 22 and any degree of deflection of the latter may be obtained.

The installation of the switch box 10 through the use of the clamps 20 is but a simple matter. As shown in Fig. 3, two of the clamps 20 are fixed to opposite sides of the box 10 merely by slipping the channels 21a over the exposed edges of the side walls 14. The box, with the clamps so attached, may then be inserted through the opening 11 in the panel 12 until the mounting flanges 18 bear against the outer face of the panel. The take-up means or screws 30 are next tightened so that the weakened hinge portions 24 are deformed and the jaw portions 22 deflected outwardly from the box and into engagement with the marginal edges of the opening 11 at the rear face of the panel 12. This firmly clamps the panel 12 between the mounting flanges 18 and the jaw portions 22 so that the box 10 is held in place even though the opening 11 might be somewhat oversize with respect to the box. Such installation is completed in an instant and any desired degree of clamping may be obtained by tightening the screws 30 to the desired extent.

It will be readily observed that while the mounting clamps of the present invention provide an advantageous solution to the problem of mounting switch boxes or other similar fixtures in oversize openings of old or existing wall panels, the clamps 20 may themselves be easily and economically manufactured. Since as illustrated, the clamps 20 may each be formed of a single blank of sheet metal stock and a single screw 30, only a simple stamping and forming operation is necessary in their manufacture.

I claim:

A clamp for mounting a fixture in an opening defined in a panel, said clamp comprising the combination of a single piece of sheet metal stock having an attachment portion providing an inwardly disposed channel adapted to be fixed to the edge of the fixture, a plate-like jaw portion originally disposed so as to lie parallel to and closely spaced from the exterior side of the fixture when the piece is so attached and offset outwardly from the attachment portion, said piece further having a central aperture therein between said attachment and jaw portions, hinge portions disposed on opposite sides of said aperture and interposed between said attachment and jaw portions defining a single transverse axis, first and second tabs connected respectively with and extending outwardly at substantially right angles to said attachment and jaw portions on opposite sides of said hinge axis, said tabs comprising outwardly extending parts of the sheet metal stock struck therefrom along opposite edges of said aperture, and a screw connected between said tabs to draw them together and thereby swing said jaw portion outwardly about said hinge axis relative to said attachment portion.

References Cited in the file of this patent
UNITED STATES PATENTS

| | | |
|---|---|---|
| 755,555 | Weaver | Mar. 22, 1904 |
| 2,083,415 | Wood | June 8, 1937 |
| 2,491,742 | Lein | Dec. 20, 1949 |
| 2,586,728 | Shepard | Feb. 19, 1952 |
| 2,736,450 | Atkinson | Feb. 28, 1956 |